US010486081B2

(12) United States Patent
Lee

(10) Patent No.: US 10,486,081 B2
(45) Date of Patent: Nov. 26, 2019

(54) DISTILLATION SYSTEM USING MULTI STAGE STRIPPER CAPABLE OF INTEGRATED OPERATION AND STEAM CONSUMPTION REDUCTION

(71) Applicant: SUNTECO LIMITED, Anyang-si, Gyeonggi-do (KR)

(72) Inventor: Joo Sun Lee, Seongnam-si (KR)

(73) Assignee: SUNTECO LIMITED, Dongan-Gu, Anyang-si, Gyeonggi-Do (KR)

( * ) Notice: Subject to any disclaimer, the term of this patent is extended or adjusted under 35 U.S.C. 154(b) by 307 days.

(21) Appl. No.: 15/303,910

(22) PCT Filed: Apr. 25, 2014

(86) PCT No.: PCT/KR2014/003655
§ 371 (c)(1),
(2) Date: Oct. 13, 2016

(87) PCT Pub. No.: WO2015/160018
PCT Pub. Date: Oct. 22, 2015

(65) Prior Publication Data
US 2017/0036139 A1  Feb. 9, 2017

(30) Foreign Application Priority Data

Apr. 14, 2014  (KR) .................. 10-2014-0044341

(51) Int. Cl.
*B01D 3/32* (2006.01)
*B01D 1/28* (2006.01)
(Continued)

(52) U.S. Cl.
CPC ............. *B01D 3/32* (2013.01); *B01D 1/28* (2013.01); *B01D 3/007* (2013.01); *B01D 3/143* (2013.01);
(Continued)

(58) Field of Classification Search
CPC .......... B01D 1/28; B01D 3/007; B01D 3/143; B01D 3/148; B01D 3/32; B01D 3/38; B01D 3/42; B01D 5/006
See application file for complete search history.

(56) References Cited

U.S. PATENT DOCUMENTS

| 4,566,947 A | 1/1986 | Tsuruta |
| 4,992,143 A | 2/1991 | Steude et al. |
| 5,435,436 A | 6/1995 | Manley et al. |

FOREIGN PATENT DOCUMENTS

| GB | 2457187 | 8/2009 |
| JP | 1997505337 A | 5/1997 |

(Continued)

OTHER PUBLICATIONS

European Search Report, App EP14889267, dated Aug. 9, 2017, The Hague, Christian Weber.

*Primary Examiner* — Renee Robinson
*Assistant Examiner* — Derek N Mueller
(74) *Attorney, Agent, or Firm* — Gearhart Law LLC

(57) ABSTRACT

The present invention relates to a distillation system using multi-stage stripper, the distillation system being configured to separate mixed material into high volatile components and low volatile components based on difference of boiling point, the system comprising: a stripper module including a plurality of strippers, and configured to receive the feedstock material, evaporate and discharge the high volatile component as overhead vapor and to separate the low volatile component as un-distilled; a condense-evaporator configured to condense the overhead vapor and to evaporate water; and a mechanical vapor recompression module that compresses water vapor evaporated in the condense-evaporator by multi-stages.

7 Claims, 5 Drawing Sheets

(51) Int. Cl.
*B01D 3/14* (2006.01)
*B01D 3/42* (2006.01)
*B01D 5/00* (2006.01)
*B01D 3/00* (2006.01)
*B01D 3/38* (2006.01)

(52) U.S. Cl.
CPC ............... *B01D 3/148* (2013.01); *B01D 3/38* (2013.01); *B01D 3/42* (2013.01); *B01D 5/006* (2013.01); *Y02P 70/34* (2015.11)

(56) References Cited

FOREIGN PATENT DOCUMENTS

| | | | | |
|---|---|---|---|---|
| JP | 2000051602 A | | 2/2000 | |
| JP | 2009-82916 A | * | 4/2009 | ............... B01D 3/14 |
| KR | 1020000051913 A | | 8/2000 | |
| KR | 100811971 B1 | | 3/2008 | |
| WO | 1995013511 A1 | | 5/1995 | |

* cited by examiner

DISTILLATION SYSTEM USING MULTI STAGE STRIPPER CAPABLE OF INTEGRATED OPERATION AND STEAM CONSUMPTION REDUCTION

CLAIM OF PRIORITY

This application is a continuation application off of International Patent Application No. PCT/KR2014/003655 filed on Apr. 25, 2014, which claims Priority from Korean Application No. 10-2014-0044341 filed Apr. 14, 2014, the contents of which are both incorporated herein by reference.

FIELD OF THE EMBODIMENTS

The present disclosure relates to a distillation system using a multi-stage stripper capable of integrated operation and reduction of steam consumption, and more particularly, to a distillation system using a multi-stage stripper in order to separate materials from a mixed compound based on difference of boiling point, wherein overhead vapor being discharged from a stripper module is condensed to evaporate water and then the evaporated water vapor is compressed by multi-stages and supplied to at least two strippers, thereby increasing heat recovery rate of the overhead vapor of the stripper and reducing the time and cost being spent in a distillation process.

BACKGROUND OF THE EMBODIMENTS

Distillation systems are for evaporating and separating mixed materials existing in a feedstock material based on difference of boiling point. In the upper portion of a distillation system, a material with a low boiling point (high volatile component) is evaporated in the form of overhead vapor, while in the lower portion of the distillation system, a material with a high boiling point (low volatile component) is separated in a non-distilled form. Here, the high volatile component and the low volatile component may each be a singular component, or a mixture of two or more components.

Such a distillation system essentially includes an evaporative separator configured to separate materials according to difference of boiling point. Examples of such an evaporative separator include distillation column, rectification column, stripping column, stripping vessel and stripper, etc.

In the case of extracting a high volatile component to be prepared as a subject product, the rectification column is used, but in the case of extracting a low volatile component to be prepared as a subject product, the stripping column or stripping vessel (or stripper) is used. Stripping columns are usually used to extract a low volatile component having a low viscosity, and stripping vessels (or strippers) are usually used to extract a low volatile component having a high viscosity.

FIG. 1 is a view schematically illustrating a conventional distillation system having a stripping vessel. Referring to FIG. 1, the conventional distillation system 10 having a stripping vessel consists of a the stripping vessel 110 where a feedstock material is separated into a low volatile component and a high volatile component, and a condenser 120 where overhead vapor of the high volatile component is condensed. The stripping vessel 110 strips and refines the high volatile component, and recovers the refined high volatile component as raw material, while drying the low volatile component having a high viscosity to obtain a final product.

When steam is supplied from a steam supplier 160 to the stripping vessel 110, the steam directly contacts the mixed material of a high viscosity in the lower portion of the stripping vessel 110 and transfers heat thereto. By this heat, the high volatile component of the mixed material is evaporated and is discharged as overhead vapor together with water vapor, and the high boiling point material of the mixed material is discharged externally together with condensate water of the steam.

However, the distillation system of FIG. 1 separates the feedstock material into a low volatile component and a high volatile component in a singular stripping vessel 110, and thus has a problem that the feedstock material cannot be separated with precision, thereby reducing the purity or recovery rate of product.

In order to solve the aforementioned problem of the distillation system illustrated in FIG. 1, a distillation system having two or more stripping vessels was proposed.

FIG. 2 is a view schematically illustrating a conventional distillation system provided with two or more stripping vessels. Referring to FIG. 2, the distillation system 20 having two stripping vessels includes a first stripping vessel 111 to which a feedstock material is supplied, a second stripping vessel 112 to which material not stripped in the first stripping vessel 111 is supplied, a condense-evaporator 120 where overhead vapor discharged from the first stripping vessel 111 and water exchange heat, a condenser 130 where overhead vapor not condensed in the condense-evaporator 120 is condensed for the last time, and two compression modules 141, 142.

In the distillation system 20 having the two stripping vessels, first of all, a feedstock material is supplied to the first stripping vessel 111. When steam is supplied from the steal supplier 160 according to the temperature required in the first stripping vessel 111, a high volatile component of the feedstock material is discharged as overhead vapor, while a low volatile component is separated in a non-distilled form in a lower portion of the first stripping vessel 111. Here, in the first stripping vessel 111, only the high volatile components having a boiling point below a certain temperature are discharged as overhead vapor, whereas the materials having a boiling point of or above the certain temperature are not discharged as overhead vapor. For this reason or the like, not all the feedstock is separated into high volatile components and low volatile components, and thus the non-separated material is supplied to the second stripping vessel 112 to be further separated.

The overhead vapor discharged from the first stripping vessel 111 exchanges heat with water in the condense-evaporator 120 to generate saturated water vapor, and then passes the first compression module 141, and is re-supplied to the first stripping vessel 111. In the first stripping vessel 111, this re-supplied water vapor is used to separate the feedstock material.

Meanwhile, the overhead vapor not condensed in the condense-evaporator 120 is supplied to the condenser 130, and is condensed for the last time. The condensed solution generated in the condenser 130 is separated from water based on specific gravity, and is supplied to a distillation column 180. A re-boiler 190 supplies steam to the distillation column, and steam condensate water generated in the re-boiler 190 is expanded under low pressure (flashed), and then compressed in the second compression module 142, and then supplied to the second stripping vessel 112. This steam condensate water supplied to the second stripper vessel 112 exchanges heat with the feedstock material discharged from the first stripping vessel 111, and is used for the final stripping.

That is, the condensed solution that has been condensed and separated in the condenser must be supplied to the distillation column 180 to be distilled, and the high temperature steam condensate water must be expanded and evaporated in the re-boiler 190, and then compressed in the second compression module 142 and supplied to the second stripping vessel 112. Generally, it takes several hours for a multi-stage stripping process to stabilize after the overhead vapor discharged from the first stripping vessel 111 is condensed and separated and supplied to the distillation column. In order to initially drive the first stripping vessel 111, steam is supplied from the steam supplier 160 according to the temperature required in the first stripping vessel 111, and even when the water vapor generated by the heat exchange between the overhead vapor discharged from the first stripping vessel 111 and water passes the first compression module 141 and is supplied to the first stripping vessel 111 again and used, the steam is not sufficient to operate the first stripping vessel 111, and thus steam must keep being supplied from the steam supplier 160.

For this reason, due to the excessive amount of steam that needs to be supplied from outside until the second stripping vessel 112 operates to supply the overhead vapor of the second stripping vessel 112 to the first stripping vessel 111, it costs a lot of money. Further, since the temperature condition required in the second stripping vessel 111 is higher than the temperature required in the first stripping vessel 111, there occurs a problem where the first compression module 141 and the second compression module 142 must be driven separately.

Various systems are known in the art. However, their structure and means of operation are substantially different from the present disclosure. At least one embodiment of this invention is presented in the drawings below and will be described in more detail herein.

SUMMARY OF THE EMBODIMENTS

In general, the present invention succeeds in conferring the following, and others not mentioned, benefits and objectives.

Problem to be Solved

Therefore, a purpose of the present disclosure is to solve the aforementioned problems of prior art, that is, to provide a distillation system using a multi-stage stripper capable of integrated operation and reduction of steam consumption, and more particularly, to a distillation system using a multi-stage stripper in order to separate materials from a mixed compound based on difference of boiling point, where overhead vapor being discharged from a stripper module is condensed and water is evaporated, and then the evaporated water vapor is compressed by multi-stages and supplied to at least two strippers, thereby increasing heat recovery rate of the overhead vapor of the stripper and reducing time and cost being spent in a distillation process.

Technical Solutions

The aforementioned purpose of the present disclosure is achieved by a distillation system using multi-stage stripper capable of integrated operation and reduction of steam consumption, the distillation system configured to separate mixed material existing in a feedstock material into high volatile components and low volatile components based on difference of boiling point, the system comprising: a stripper module including a plurality of strippers, and configured to receive the feedstock material, evaporate and discharge the high volatile component as overhead vapor and configured to separate the low volatile component as un-distilled in a lower portion of the stripper, wherein gas-liquid equilibrium pressure and temperature of the high volatile component being evaporated in each of the strippers are different from each other; a condense-evaporator configured to condense the overhead vapor that passed through the stripper module and to evaporate water supplied from a source of water supply by heat exchanging the overhead vapor with the water; and a mechanical vapor recompression module (MVR) that compresses water vapor evaporated in the condense-evaporator by multi-stages, wherein the water vapor compressed in the mechanical vapor recompression module is supplied to at least two strippers.

Here, it is preferable that a portion of the water vapor compressed in the mechanical vapor recompression module is supplied to the stripper that evaporates the high volatile component with the highest temperature.

Here, it is preferable that the stripper module includes a first stripper configured to receive the feedstock material, evaporate the high volatile component, and discharge the evaporated high volatile component as the overhead vapor, and configured to separate the low volatile component as un-distilled in the lower portion of the stripper; and a second stripper configured to operate at a higher temperature than the first stripper, receive material that is not evaporated in the first stripper, strip the high volatile component, discharge the stripped high volatile component as the overhead vapor, and configured to separate the low volatile component as un-distilled in the lower portion of the stripper, wherein a portion of the water vapor compressed in the mechanical vapor recompression module is preferentially supplied to the second stripper, and the rest of the water vapor is supplied to the first stripper.

Here, it is preferable that the temperature and pressure of the water vapor passing through the mechanical vapor recompression module is the temperature and pressure required to separate the feedstock material in the first stripper, and that the system further includes a thermal vapor recompression (TVR) module that induces a portion of the water vapor passing the mechanical vapor recompression module to be supplied towards the second stripper, and that increases the temperature and pressure of the water vapor being supplied to the second stripper to the temperature and pressure required to separate the feedstock material in the second stripper.

Here, it is preferable that the overhead vapor of the second stripper is supplied to the first stripper so as to be used as a heat source necessary for separating the feedstock material in the first stripper.

Here, it is preferable that the system further includes a steam supplier that supplies steam to the first stripper and the second stripper; a first valve that is configured to be opened or closed so as to control whether or not to supply the steam to the first stripper; and a second valve that is configured to be opened or closed so as to control whether or not to supply the steam to the second stripper.

Here, it is preferable that the system further includes a third valve that is configured to be opened or closed, and configured to induce a portion of the steam being supplied from the steam supplier towards the thermal vapor recompression module.

Here, it is preferable that the mechanical vapor recompression (MVR) module includes a first module that is configured as a plurality of mechanical vapor recompression apparatuses; a second module that is configured as a plurality of mechanical vapor recompression apparatuses, and that further compresses the water vapor that passed through the first module; and a laminator that reduces the velocity of the compressed water vapor that passed through the first module and supplies the compressed water vapor to the second module.

Here, it is preferable that the system further includes a condenser that receives the overhead vapor not condensed in the evaporator and condenses the received overhead vapor; and a distillation column that receives solution condensed in the condenser.

Here, it is preferable that the system further includes a re-boiler that supplies the steam to the distillation column, wherein steam condensate water of the re-boiler is evaporated and is supplied to the laminator.

Here, it is preferable that the laminator adjusts the temperature of the compressed water vapor that passed through the first module and the temperature of the vapor evaporated from the steam condensate water supplied form the re-boiler to be identical to each other.

Here, it is preferable that a flow rate controller is installed on an inlet end of the first module.

Advantageous Effects

According to the present disclosure, there is provided distillation system using a multi-stage stripper capable of integrated operation and reduction of steam consumption, where water is evaporated by the overhead vapor being discharged from the stripper module stripper, and then the evaporated water vapor is compressed by multi-stages and supplied to at least two strippers, thereby increasing heat recovery rate of the overhead vapor of the stripper and reducing time and cost being spent in a distillation process.

Further, the present disclosure provides a distillation system using a multi-stage stripper capable of integrated operation and reduction of steam consumption regardless of the type of the subject material to be stripped since water and overhead vapor exchange heat in a condense-evaporator, and thus may be applied regardless of the components forming the high volatile component or difference in saturated vapor pressure.

Further, as the water vapor evaporated in the condense-evaporator is compressed by multi-stages and supplied to at least two strippers, the second stripper and the first stripper may be driven almost at the same time.

Further, as the saturated water vapor being discharged from the second module is supplied to the first stripper and the second stripper, the first module and the second module may be controlled at the same time.

Further, as a laminator is installed between the first module and the second module, the saturated water vapor may be introduced into the second module at an even vapor density, thereby preventing the second module from being damaged.

Further, as the laminator is installed between the first module and the second module, the temperature of the vapor being supplied from the re-boiler and the temperature of the saturated water vapor being discharged from the first module may be adjusted to be the same, and then supplied to the second module.

Further, as a thermal vapor recompression module is installed, the saturated water vapor being discharged from the second module may be easily supplied towards the second stripper.

Further, as the thermal vapor recompression module is installed, the temperature and pressure of the saturated water vapor being discharged from the second module may be easily set to the temperature and pressure required in the stripping process in the second stripper.

Further, after the condensate water from the condenser is introduced into the distillation column, steam need not be supplied from the steam supplier to the first stripper, thereby effectively reducing the cost being spent in the distillation process.

DESCRIPTION OF THE PREFERRED EMBODIMENTS

Figure 1:
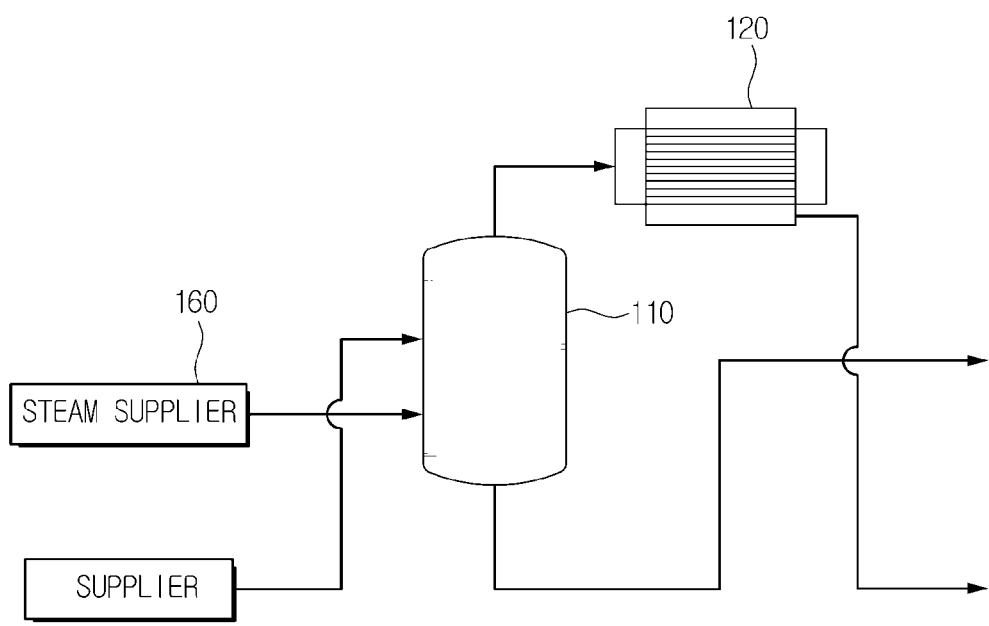
FIG. 1 is a view schematically illustrating a conventional distillation system having a stripping vessel.
Figure 2:
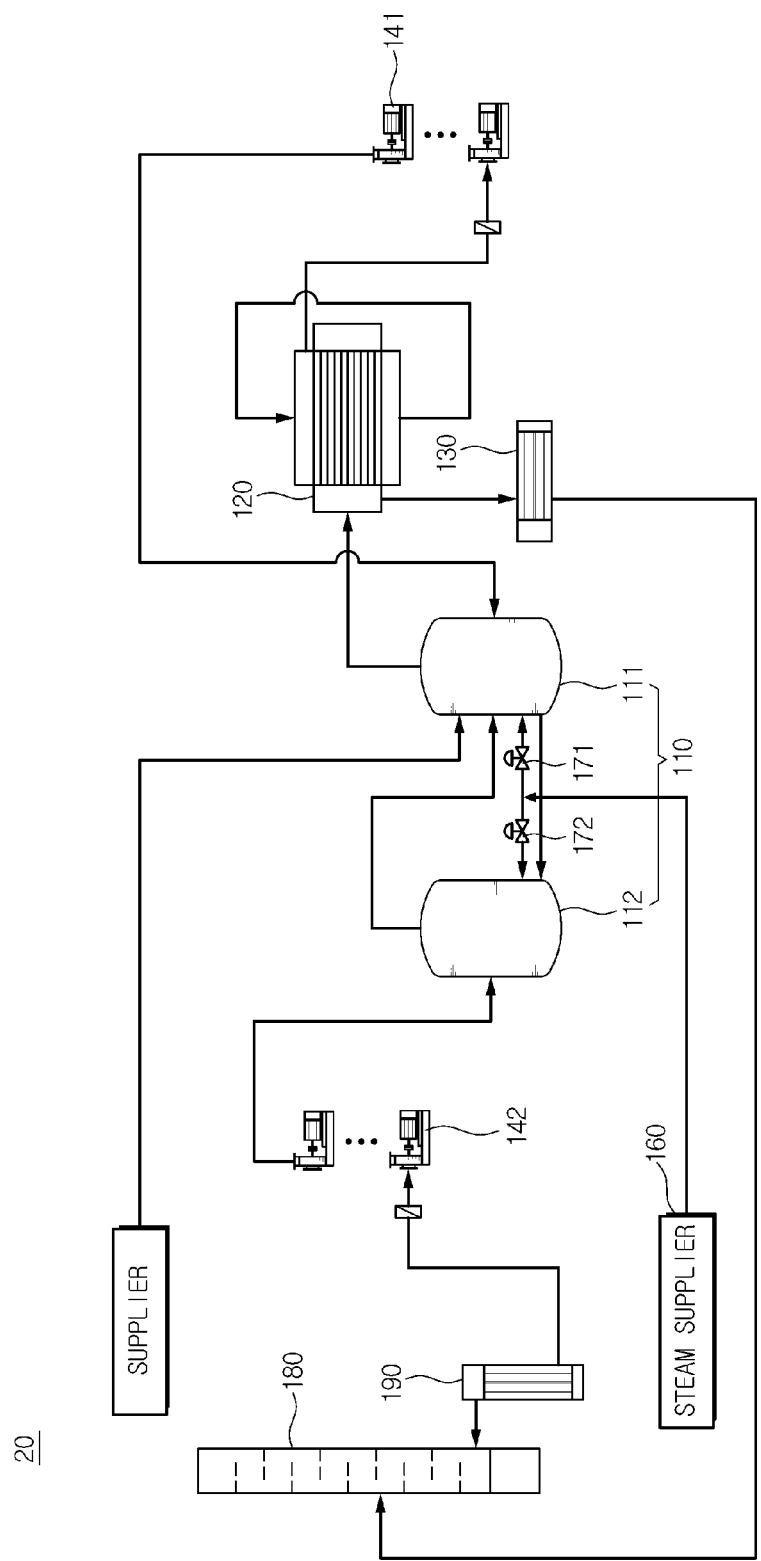
FIG. 2 is a view schematically illustrating a conventional distillation system having two or more stripping vessels.

The preferred embodiments of the present invention will now be described with reference to the drawings. Identical elements in the various figures are identified with the same reference numerals.

Reference will now be made in detail to each embodiment of the present invention. Such embodiments are provided by way of explanation of the present invention, which is not intended to be limited thereto. In fact, those of ordinary skill in the art may appreciate upon reading the present specification and viewing the present drawings that various modifications and variations can be made thereto.

Hereinafter, a distillation system using a multi-stage stripper capable of integrated operation and reduction of steam consumption will be explained in detail with reference to the drawings attached.

The present invention relates to a distillation system using a multi-stage stripping vessel, that is, a multi-stage stripper. The distillation system using a multi-stage stripper capable of integrated operation and reduction of steam consumption according to an embodiment of the present invention relates to a distillation system using a multi-stage stripper capable of integrated operation and reduction of steam consumption, where water is evaporated using overhead vapor being discharged from the stripper module, and then the evaporated water vapor is compressed by multi-stages and supplied to at least two strippers, thereby increasing heat recovery rate of the overhead vapor of the stripper module and reducing the cost being spent in a distillation process.

Figure 3:
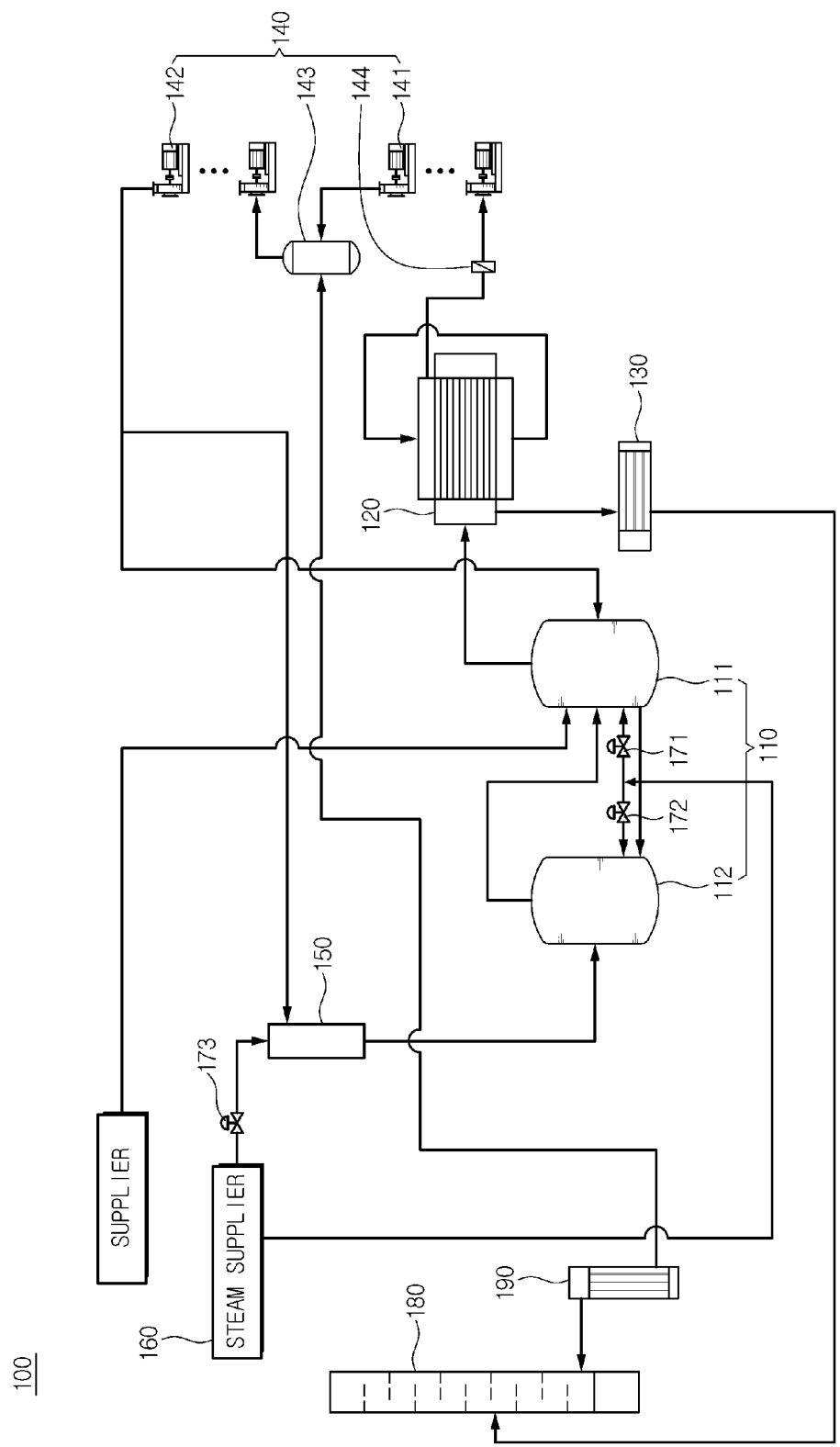
FIG. 3 is a view schematically illustrating a distillation system using a multi-stage stripper capable of integration operation and reduction of steam consumption according to an embodiment of the present disclosure.

FIG. 3 is a view schematically illustrating a distillation system using a multi-stage stripper capable of integration operation and reduction of steam consumption according to an embodiment of the present disclosure. Referring to FIG. 3, the distillation system 100 using a multi-stage stripper capable of integrated operation and reduction of steam consumption includes a stripper module 110 where a feedstock material is supplied, a condense-evaporator 120 where the overhead vapor discharged from the stripper module 110 and water exchange heat, a condenser 130 where the overhead vapor not condensed in the condense-evaporator 120 is supplied and condensed, a mechanical vapor recompression module 140 where saturated water vapor generated in the condense-evaporator 120 is supplied and compressed, a thermal vapor recompression module 150 that increases the temperature and pressure of a portion of the saturated water vapor that passed the mechanical vapor recompression module 140, valves 170 that control whether or not to supply steam from the steam supplier 160, a distillation column 180 and a re-boiler 190.

The stripper module 110 refers to the stripping vessel module for stripping a monomer of a low boiling point from the feedstock material to obtain a polymer of a high boiling point having a high viscosity, and the stripper module 110 includes a first stripper 111 and a second stripper 112. Here, the feedstock material may be, for example, a mixed material that may be produced after a polymerization reaction of synthetic rubber.

The first stripper 111 is an apparatus configured to be supplied with the feedstock material in which mixed material or the like exists, and to separate a high volatile component and a low volatile component. To the first stripper 111, steam is supplied from the steam supplier 160 through a first valve 171 that is controlled according to conditions such as temperature or the like required in the first stripper 111. Further, overhead vapor is supplied from the second stripper 112, and saturated water vapor discharged from the second module 142 is supplied. The aforementioned steam and the saturated water vapor are the same material. The steam supplied from the steam supplier 160 directly contacts the low volatile component in a lower portion of the first stripper 111 and transfers heat, and by this heat, the high volatile component of the mixed material is evaporated, and is discharged as overhead vapor together with water vapor.

Meanwhile, the first stripper 111 does not evaporate all the high volatile components existing in the feedstock material. Each of the high volatile component and the low volatile component may be a mixed material of two or more components, in which case, the temperature of the steam required to evaporate all the high volatile components may be high, thereby incurring a lot of cost. Therefore, the first stripper 111 is configured to evaporate only the high volatile components having a boiling point below a certain temperature.

The second stripper 112 is an apparatus that receives the high volatile components not separated in the first stripper 111 and the low volatile components, and separates the components. In the first stripper 111, only the high volatile components having a boiling point of below a certain temperature are evaporated, and the high volatile components having a boiling point of or above the certain temperature are evaporated in the second stripper 112, and thus the second stripper 112 is driven at a higher temperature than the first stripper 111.

The second stripper 112 is configured to receive steam from the steam supplier 160 and the thermal vapor recompression module 150. Specifically, the steam is supplied from the steam supplier 160 through the second valve 172 that is controlled according to conditions such as temperature or the like required in the second stripper 112. Further, from the thermal vapor recompression module 150, the steam that passed through the third valve 173 controlled according to the conditions such as temperature or the like required in the second stripper 112 and through the second module 142 is supplied.

Meanwhile, the second stripper 112 operates at a higher temperature than the first stripper 111. Therefore, the overhead vapor being discharged from the second stripper 112 is supplied to the first stripper 111, and this overhead vapor is used as a source of heat for separating the feedstock material in the first stripper 111.

The condense-evaporator 120 is a configuration for condensing overhead vapor of a single or two or more different components which has different saturated vapor pressures and which is supplied from the first stripper 111, and for transferring a maximum quantity of heat to water, thereby generating water vapor having the quantity of heat corresponding to the transferred quantity of heat. Specifically, to the condense-evaporator 120, water is supplied from a separate source of water supply, and overhead vapor of an amount required in the condense-evaporator 120 is condensed to transfer the quantity of heat to the water such that the saturated water vapor may be compressed in the mechanical vapor recompression module 140 up to the temperature and pressure required in the first stripper 111. The rest of the overhead vapor that is not condensed is supplied to the condenser 130, and the water that received heat from the overhead vapor becomes saturated water vapor and is supplied to the mechanical vapor recompression module 140.

In the present embodiment, the water vapor generated by heat exchange with overhead vapor is compressed and used as a heat medium, and thus it is unnecessary to compress the overhead vapor, and thus the present embodiment may be applied in distilling high volatile components of two or more components having different saturated vapor pressures, without limitation. Further, since the condensed latent heat of the overhead vapor may be removed by evaporated latent heat of water, there is an advantage that a relatively small amount of water can be used compared to the removal by sensible heat of circulating cooling water.

The condenser 130 is a configuration for condensing overhead vapor not condensed in the condense-evaporator 120. The overhead vapor not condensed in the condense-evaporator 120 is supplied to the condenser 130 to be condensed for the last time. The condensed solution generated in the condenser 130 is separated based on specific gravity, and then supplied to the distillation column 180.

The mechanical vapor recompression module 140 is a configuration for compressing the saturated water vapor generated in the condense-evaporator 120 to the temperature and pressure required in the first stripper 111, and the mechanical vapor recompression module 140 includes a first module 141, a second module 142, a laminator 143 and a flow rate controller 144.

The first module 141 is a configuration for compressing the saturated water vapor generated in the condense-evaporator 120. The first module 141 is provided as a plurality of mechanical vapor recompression apparatuses.

Examples of the mechanical vapor recompression apparatus that may be used herein include a high velocity compressor and a low velocity blast centrifugal compressor, etc. A low velocity blast centrifugal compressor is a compressor of low velocity below 10000 rpm. It is of low cost and drives at a low velocity, and thus provides an advantage of stable operation without causing any damage to the compressor. However, since the low velocity blast centrifugal compressor is a compressor of low velocity below 10000 rpm, preferably 4000 to 7000 rpm, it provides a low compression ratio compared to a high velocity multi-stage turbo compressor, and therefore, the blast centrifugal compressor is provided in plural numbers in order to compensate for the low compression ratio. That is, the saturated water vapor saturated in the condense-evaporator 120 is compressed by multi-stages in the plurality of blast centrifugal compressors according to a certain compression ratio. Although it was explained hereinabove that in the present embodiment the mechanical vapor recompression apparatus is a low velocity blast centrifugal compressor, as long as the saturated water vapor can be compressed such that the conditions such as the temperature and pressure of the saturated water vapor generated in the condense-evaporator 120 correspond to the temperature and pressure required in the first stripping vessel 111, the mechanical vapor recompression apparatus is not limited thereto.

In an inlet end of the first module 141, a flow rate controller 144 may be installed. At an initial stage of driving the first stripper 111, there is not so much overhead vapor, and thus, the amount of saturated water vapor being generated in the condense-evaporator 120 may be small. If this amount is lower than the flow rate required in the mechanical vapor recompression apparatus, noise and vibration may occur, and the mechanical vapor recompression apparatus may be damaged. Here, by installing the flow rate controller 144, the aforementioned problem can be prevented. Examples of the flow rate controller 144 that may be used include an inlet guide vane (IGV) and an inverter motor controller, etc.

The second module 142 is a configuration for compressing the saturated water vapor compressed in the first module 141 for the last time such that it may have the temperature and pressure required in the first stripper 111. The second module 142 is provided as a plurality of mechanical vapor recompression apparatuses. Meanwhile, the mechanical vapor recompression apparatus of the second module 142 may be provided as a low velocity blast centrifugal compressor just as in the first module 141.

The laminator 143 is a configuration installed between the first module 141 and the second module 142 to reduce the velocity by which the saturated water vapor is discharged from the first module 141 and to control the temperature.

The first module 141 is configured as a plurality of blast centrifugal compressors to compress the saturated water vapor generated in the condense-evaporator 120 in multi-stages. The saturated water vapor that passed through the plurality of blast centrifugal compressors have a very high velocity pressure, and thus a powerful vortex will be formed by a rotary motion of an impeller or the like. This makes the distribution of vapor density being introduced into the second module 142 uneven, and thus, due to the high velocity pressure, an overstress may occur on a portion of an impeller cross-section of the blast centrifugal compressor of the second module 142, causing concerns for vibration and damage. However, by installing the laminator 143 between the first module 141 and the second module 142, the velocity of the saturated water vapor being discharged from the first module 141 may be reduced, and most of the high velocity pressure of the saturated water vapor at 50 to 90 m/s may be converted into static pressure, enabling the vapor to be introduced into the second module 142 slowly at an even vapor density without causing a vortex phenomenon.

Further, the laminator 143 adjusts the temperature of the saturated water vapor being discharged from the first module 141. Not only the saturated water vapor being discharged from the first module 141 but also the vapor expanded and evaporated from the steam condensate water generated in the re-boiler 190 is supplied to the laminator 143. After achieving an equilibrium of temperature between the saturated water vapor and the vapor from the re-boiler, the laminator 143 supplies the saturated water vapor and the vapor to the second module 142. That is, after adjusting the temperature of the vapor expanded and evaporated from the steam condensate water generated in the re-boiler 190 and the temperature of the saturated water vapor being discharged from the first module 141 to be identical to each other, the vapor from the re-boiler and the saturated water vapor are supplied to the second module 142 to be compressed to the temperature and pressure required in the first stripper 111.

The thermal vapor recompression module 150 is a configuration for compressing the saturated water vapor that passed through the mechanical vapor recompression module 140 to the temperature and pressure required in the second stripper 112. A portion of the saturated water vapor that passed through the mechanical vapor recompression module 140 is supplied to the second stripper 112, and is used to separate the feedstock material, and the rest of the saturated water vapor is supplied to the first stripper 111, and is used to separate the feedstock material. Here, the water vapor that passed through the mechanical vapor recompression module 140 is preferentially compressed to the temperature and pressure required in the first stripper 111. Since the second stripper 112 is driven at a higher temperature than the first stripper 111, the water vapor that passed the mechanical vapor recompression module 140 needs to be compressed additionally. The saturated water vapor is compressed as it passes through the thermal vapor recompression module 150 to have the temperature and pressure required in the second stripper 112, and the amount of steam necessary in the second stripper 112 is automatically supplied by the third valve 173 installed on the thermal mechanical recompression module 150.

In the present embodiment, the saturated water vapor that passed through the second module 142 is preferentially introduced towards the second stripper 112. Therefore, the thermal vapor recompression module 150 absorbs the saturated water vapor that passed through the second module 142 and introduces the saturated water vapor into the second stripper 112. Further, when the second stripper 112 and the second module 142 are spaced far apart from each other, it is difficult for the saturated water vapor that passed through the second module 142 to be introduced into the second stripper 112. In this case, the thermal vapor recompression module 150 absorbs the saturated water vapor that passed through the second module 142 and preferentially induces introduction of the saturated water vapor towards the second stripper 112.

The steam supplier 160 is a configuration for supplying steam to the stripper module 110, that is, to the first stripper 111 and second stripper 112 and the thermal vapor recompression module 150. When the steam supplied from the steam supplier 160 is supplied to the first stripper 111, the steam directly contacts the high volatile component in the lower portion and transfers heat, and by this heat, the high volatile component of the mixed material is evaporated and is discharged as overhead vapor together with the water vapor.

The valve 170 is a configuration for controlling whether or not to supply steam to the stripper module 110, and the valve 170 includes the first valve 171, the second valve 172 and the third valve 173.

The first valve 171 is a configuration for controlling whether or not to supply the steam being supplied from the steam supplier 160 to the first stripper 171. The first valve 171 controls the amount of steam to be supplied to the first stripper 111 according to the temperature condition required to separate the feedstock material in the first stripper 111. The first valve 171 is opened at the initial stage of driving the distillation system 100, enabling steam to be supplied inside the first stripper 111. Until the vapor evaporated from the steam condensate water of the re-boiler 141 is supplied to the laminator 143, the vapor which passed through the first module 141, was compressed in the second module 142, and then was re-compressed in the thermal vapor recompression is preferentially supplied to the second stripper 112. The amount of vapor lacking the third valve 173 of the thermal vapor recompression module 150 is supplied from the second valve 172.

The second valve 172 is a configuration for controlling whether or not to supply the steam being supplied from the steam supplier 160 to the second stripper 112. Unlike the first valve 171, the second valve 172 is not opened at the initial driving stage of the apparatus, but is opened when the amount of steam being supplied from the third valve 173 after the third valve 173 was opened as will be explained hereinafter is insufficient for gas-liquid pressure equilibrium with the first stripper 111. In that case, the opened second valve 172 supplements steam, so that the feedstock material can be separated in the second stripper 112.

The third valve 173 is a configuration for controlling whether or not to supply the steam being supplied from the steam supplier 160 to the second stripper 112. However, unlike the second valve 172, the third valve 173 does not allow the steam to be supplied directly to the second stripper 112, but to be supplied to the thermal vapor recompression module 150. That is, the third valve 173 limits the amount of steam being supplied to thermal vapor recompression module 150 according to the temperature condition required in the second stripper 112, and then the steam is supplied to the second stripper 112 after being compressed in the thermal vapor recompression module 150.

The distillation column 180 is a configuration for receiving the condensate water generated in the condenser 130 and then for rectifying the condensate water received. The re-boiler 190 is a configuration for supplying steam into the distillation column 180. The condensate water of the steam generated in the re-boiler 190 is expanded and evaporated, and then supplied to the laminator 143. As aforementioned, the temperature of the vapor being evaporated and supplied to the laminator 143 and the temperature of the vapor being supplied from the first module 141 to the laminator 143 are different from each other, but they are adjusted to the same temperature in the laminator 143, and are then supplied to the second module.

Hereinafter, an operation of the distillation system using a multi-stage stripper capable of integration operation and reduction of steam consumption according to an embodiment of the present disclosure will be explained.

Operations before and after the condensate water generated in the condenser 130 is supplied to the distillation column 180 will be explained separately.

Figure 4:
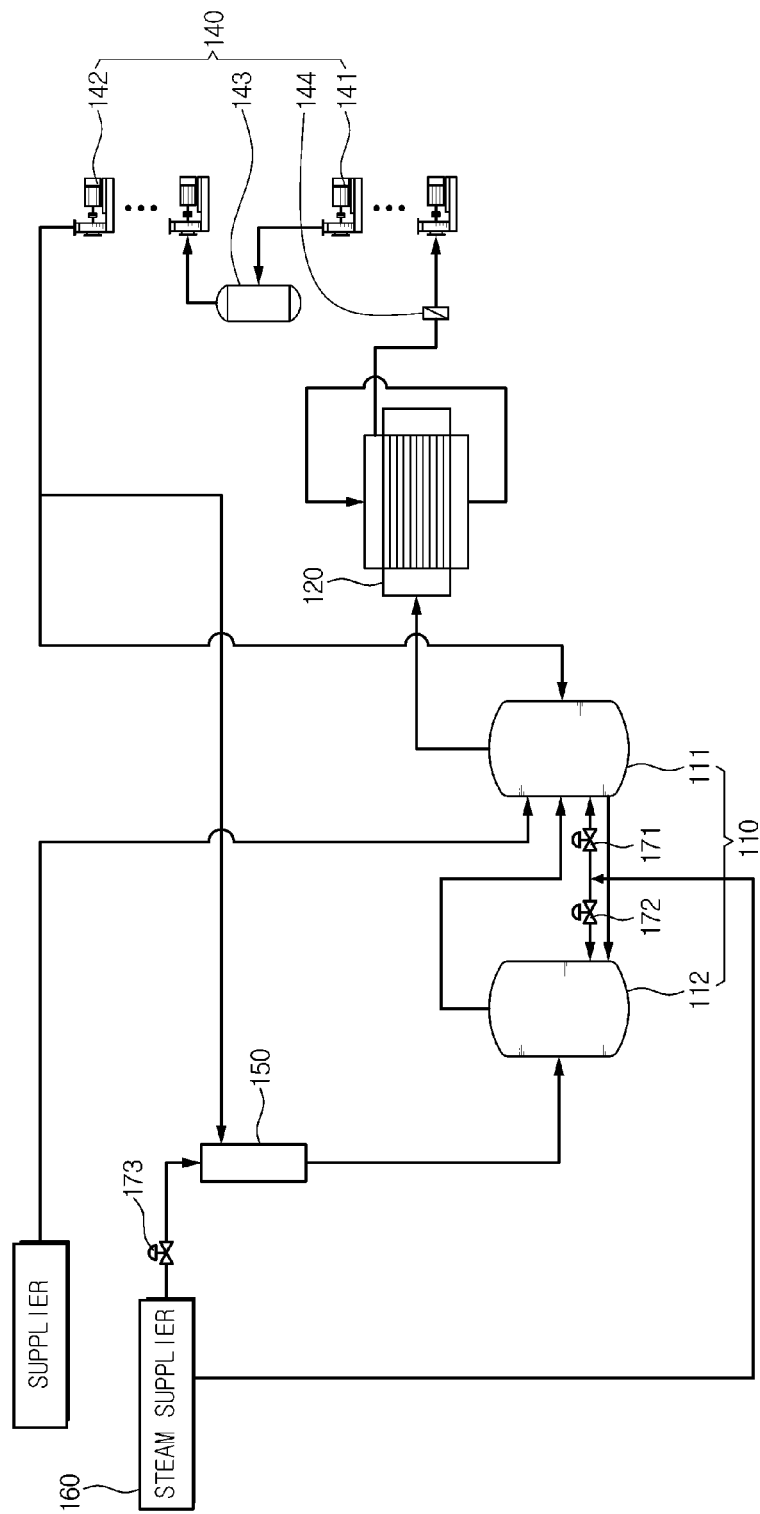
FIG. 4 is a view schematically illustrating an operation before the condensed solution generated in the condenser is supplied to the distillation column in the distillation system using a multi-stage stripper capable of integration operation and reduction of steam consumption.

1. Operation Before the Condensate Water Generated in the Condenser is Supplied to the Distillation Column FIG. 4 is a view schematically illustrating an operation before the condensate water generated in the condenser is supplied to the distillation column in the distillation system using a multi-stage stripper capable of integration operation and reduction of steam consumption.

First of all, feedstock material is supplied from the supplier to the first stripper 111.

The first valve 171 that is controlled according to conditions such as temperature or the like required in the first stripper 111 is opened, so that steam is supplied from the steam supplier 160 to the first stripper 111. The steam directly contacts the low volatile component in the lower portion of the first stripper 111 and transfers heat thereto. By this heat, the high volatile component, of the feedstock material, having a boiling point of below a certain temperature is evaporated and is discharged as overhead vapor together with water vapor, while low volatile components that are not distilled are supplied to the second stripper 112.

The overhead vapor discharged from the first stripper 111 is introduced into the condense-evaporator 120. A portion of the overhead vapor is condensed in the condense-evaporator 120 and transfers quantity of heat to water being provided from a separate source of water supply. The water that received heat from the overhead vapor turns into saturated water vapor, and this saturated water vapor is supplied to the mechanical vapor recompression module 140, while the overhead vapor that is not condensed is supplied to the condenser 130.

The saturated water vapor generated in the condense-evaporator 120 is supplied to the first module 141. Here, there may be a flow rate controller 144 installed to control the flow rate of the saturated water vapor being supplied to the first module 141.

The saturated water vapor is compressed by multi-stages as it passes through the first module 141, and then is supplied to the laminator 143. As the saturated water vapor passes the first module 141, its velocity pressure increases, and a vortex may be formed by rotation of an impeller or the like. This may lead to an uneven distributing of vapor density being introduced into the second module 142, causing damage to the second module 142. On the other hand, the laminator 143 of the present disclosure reduces the velocity pressure of the saturated water vapor, prevents the vortex from being formed, and preferably makes the saturated water vapor to make a straight line motion, and makes the saturated water vapor to be introduced at an even vapor density into the second module 142. Meanwhile, as the velocity pressure is reduced as aforementioned, the static pressure will increase, but the saturated water vapor will be introduced at an even vapor density into the second module 142 compared to when the velocity pressure is high, thereby preventing the apparatus from being damaged. The saturated water vapor that passed through the laminator 143 and that is introduced into the second module 142 is further compressed by multi-stages to meet the temperature and pressure condition for separating the feedstock material in the first stripper 111.

A portion of the saturated water vapor discharged from the second module 142 is preferentially absorbed by the thermal vapor recompression module 150. That is, the portion of the saturated water vapor discharged from the second module 142 is supplied to the thermal vapor recompression module 150 while the rest of the saturated water vapor is supplied to the first stripper 111. The saturated water vapor introduced into the thermal vapor recompression module 150 is further compressed to the temperature and pressure required in the second stripper 112, and thereafter, this further compressed saturated water vapor separates the feedstock material in the second stripper 112. Here, at the initial stage of driving the distillation system 100, the amount of overhead vapor generated in the first stripper 111 is not sufficient, and a portion of the water vapor is supplied to the second stripper 112 by the thermal vapor recompression module 150. But since that amount is insufficient at the initial driving stage, water vapor may be supplemented by controlling the second valve 172.

Meanwhile, the overhead vapor generated by the separating of feedstock material by means of the steam being supplied to the second stripper 112 is supplied to the first stripper 111. Since the temperature required in the second stripper 112 is higher than the first stripper 111, the overhead vapor of the second stripper 112 may be used as a heat source for the first stripper 111. When the supplying of steam by the first valve 171 at the first stripper 111 is controlled in a satisfactory manner, the second valve 172 supplying the steam to the second stripper 112 is closed, and by controlling the third valve 173, the first stripper 111 and the second stripper 112 enter a stable operation state. Of course in this process, the condensed solution generated and separated in the condenser is supplied to the distillation column 180, and the vapor expanded and evaporated in the re-boiler 190 is introduced into the laminator 143, enabling the first module 141 and the second module 142 to enter the stable operation state.

Figure 5:
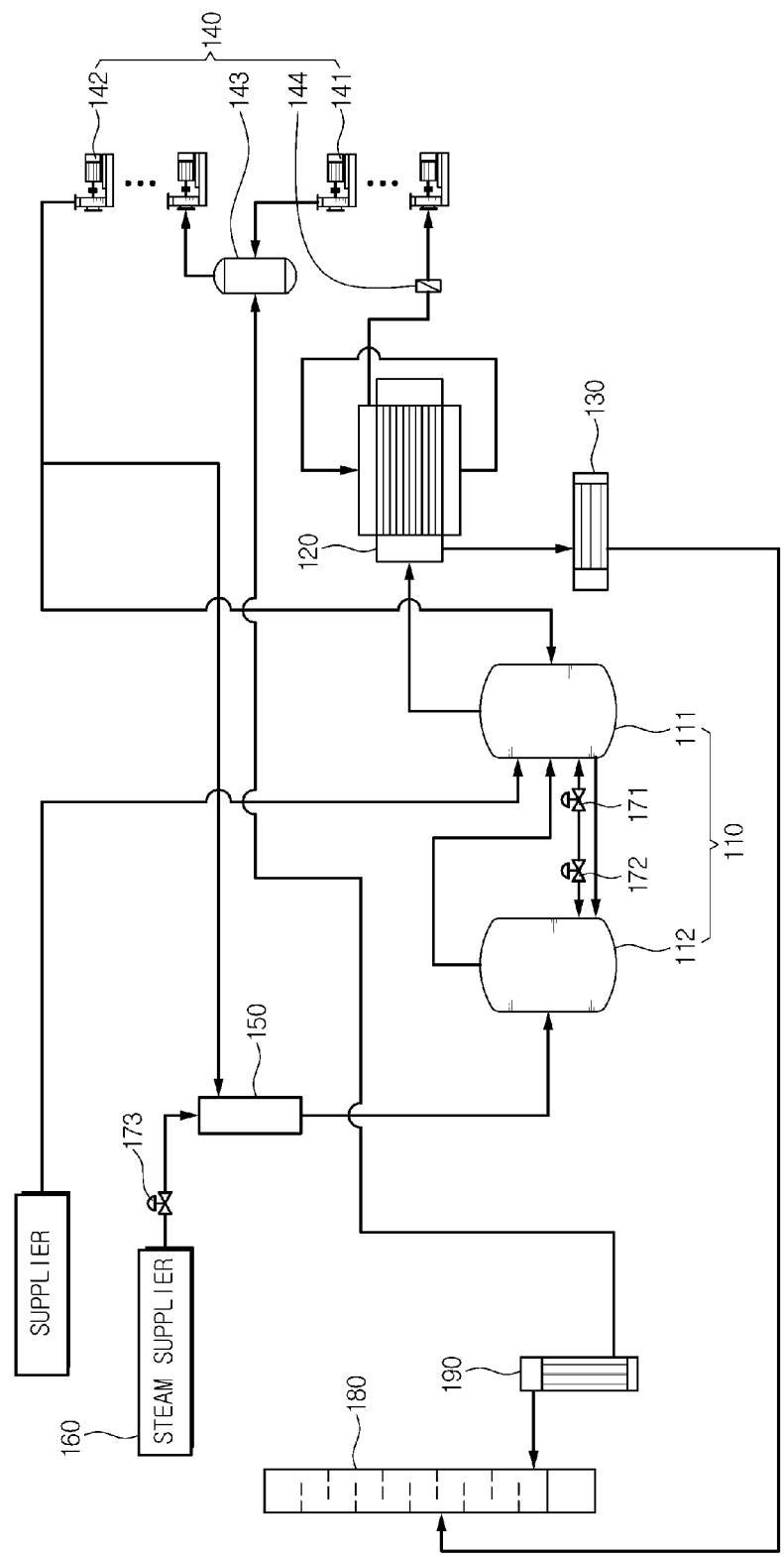
FIG. 5 is a view schematically illustrating an operation after the condensed solution generated in the condenser is supplied to the distillation column in the distillation system using a multi-stage stripper capable of integration operation and reduction of steam consumption.

2. Operation after the Condensate Water Generated in the Condenser is Supplied to the Distillation Column FIG. 5 is a view schematically illustrating an operation after the condensate generated in the condenser is supplied to the distillation column in the distillation system using a multi-stage stripper capable of integration operation and reduction of steam consumption.

As aforementioned, the overhead vapor not condensed in the condense-evaporator 120 is supplied to the condenser 130, and then is condensed for the last time. The condensed solution generated and separated in the condenser 130 is supplied to the distillation column 180, and then is rectified. Here, for the rectifying in the distillation column 180, steam is supplied from the re-boiler 190.

Steam condensate water is generated in the re-boiler 190, and the generated steam condensate water is evaporated and then is supplied to the laminator 143. That is, after the condensate water is supplied to the distillation column 180, the saturated water vapor discharged from the first module 141 and the vapor evaporated from the steam condensate water discharged from the re-boiler 190 are supplied to the laminator 143.

The laminator 143 adjusts the temperature of the saturated water vapor and the temperature of the vapor from the re-boiler to be the same and reduces the velocity pressure, and enables the saturated water vapor and the vapor from the re-boiler to be supplied to the second module 142. That is, compared to the operation before the condensed solution is supplied to the distillation column 180, an increased amount of saturated water vapor is supplied to the second module 142 and is compressed.

The saturated water vapor discharged from the second module 142 is absorbed and compressed by the thermal vapor recompression module 150, and then supplied to the second stripper 112. The thermal vapor recompression module 150 is designed such that the vapor generated from the steam condensate water discharged from the re-boiler 190 is added and thus, the amount of steam being supplied by the third valve 173 is sufficient to cover the amount to be supplied to the second stripper 112.

Then, the overhead vapor generated by the stripping reaction in the seconds tripper 112 is supplied to the first stripper 111. Since sufficient amount of steam is supplied to the second stripper 112, sufficient amount of overhead vapor may be supplied to the first stripper 111. Further, since there is a large amount of saturated water vapor being discharged from the second module 142, a large amount of saturated water vapor is supplied to the first stripper 111. Therefore, there is sufficient amount of steam to cover the required amount in the first stripper 111. Accordingly, whether or not to shut off supply of new steam by closing the first valve 171 depends on the composition of the overhead vapor of the multi-stage stripper, but generally, it is expected that just a small amount of steam needs to be supplemented.

Then, the overhead vapor generated in the first stripper 111 is supplied to the condense-evaporator 120 again, and the aforementioned circulation process is repeated.

Therefore, the present disclosure provides a distillation system using a multi-stage stripper, where water is evaporated using the overhead vapor being discharged from a stripper module, and then the evaporated water vapor is compressed by multi-stages and then supplied to at least two strippers, thereby increasing heat recovery rate of the upper steam of the stripper and reducing the cost spent in a distillation process.

In the drawings and specification, there have been disclosed typical embodiments of the invention, and although specific terms are employed, they are used in a generic and descriptive sense only and not for purposes of limitation. It will be understood by those of ordinary skill in the art that various changes in form and details may be made therein without departing from the spirit and scope of the present invention as defined by the following claims.

INDUSTRIAL APPLICABILITY

The present disclosure provides a distillation system using a multi-stage stripper capable of integrated operation and reduction of steam consumption, the distillation system configured to separate mixed material based on difference of boiling point, where water is evaporated using the overhead vapor being discharged from a stripper module, and then the evaporated water vapor is compressed by multi-stages and then supplied to at least two strippers, thereby increasing heat recovery rate of the upper steam of the stripper and reducing the cost spent in a distillation process.

Although this invention has been described with a certain degree of particularity, it is to be understood that the present disclosure has been made only by way of illustration and that numerous changes in the details of construction and arrangement of parts may be resorted to without departing from the spirit and the scope of the invention.

What is claimed is:

1. A distillation system using multi-stage stripper capable of integrated operation and reduction of steam consumption, the distillation system configured to separate mixed material existing in a feedstock material into high volatile components and low volatile components based on difference of boiling point, the system comprising:

a stripper module including a plurality of strippers, and configured to receive the feedstock material, evaporate and discharge the high volatile component as overhead vapor and configured to separate the low volatile component as un-distilled in a lower portion of the stripper, wherein gas-liquid equilibrium pressure and temperature of the high volatile component being evaporated in each of the strippers are different from each other;

a condense-evaporator configured to condense the overhead vapor that passed through the stripper module and to evaporate water supplied from a source of water supply by heat exchanging the overhead vapor with the water; and a mechanical vapor recompression module (MVR) that compresses water vapor evaporated in the condense-evaporator by multi-stages, where the mechanical vapor recompression (MVR) module, comprises:

a first module that is configured as a plurality of mechanical vapor recompression apparatuses;

a second module that is configured as a plurality of mechanical vapor recompression apparatuses, and that further compresses the water vapor that passed through the first module; and a laminator that reduces the velocity of the compressed water vapor that passed through the first module and supplies the compressed water vapor to the second module, wherein the mechanical vapor recompression module is arranged to supply the water vapor compressed in the mechanical vapor recompression module to at least two strippers, wherein the stripper module comprises:

a first stripper configured to receive the feedstock material, evaporate the high volatile component, and discharge the evaporated high volatile component as overhead vapor, and configured to separate the low volatile component as un-distilled in the lower portion of the stripper; and a second stripper configured to operate at a higher temperature than the first stripper, configured to be in fluid communication with the first stripper to receive material that is not evaporated in the first stripper, strip the high volatile component, and discharge the stripped high volatile component as overhead vapor, configured to separate the low volatile component as un-distilled in the lower portion of the stripper, and configured to be in fluid communication with the first stripper to supply the overhead vapor discharged from the second stripper to the first stripper, wherein the mechanical vapor recompression module is configured to be in fluid communication with the first stripper and the second stripper such that a portion of the water vapor compressed in the mechanical vapor recompression module is first supplied to the second stripper and the rest of the water vapor is supplied to the first stripper.

2. The distillation system according to claim 1, further comprising:

a condenser that receives the overhead vapor not condensed in the evaporator and condenses the received overhead vapor; and a distillation column that receives solution condensed in the condenser.

3. The distillation system according to claim 2, further comprising a re-boiler that supplies steam to the distillation column, wherein steam condensate water of the re-boiler is evaporated and is supplied to the laminator.

4. The distillation system according to claim 1, wherein the temperature and pressure of the water vapor passing the mechanical vapor recompression module is the temperature and pressure required to separate the feedstock material in the first stripper, and the system further comprises a thermal vapor recompression (TVR) module that induces a portion of the water vapor passing through the mechanical vapor recompression module to be supplied to the second stripper, and that increases the temperature and pressure of the water vapor being supplied to the second stripper to the temperature and pressure required to separate the feedstock material in the second stripper.

5. The distillation system according to claim 4, wherein the overhead vapor of the second stripper is supplied to the first stripper to be used as a heat source necessary for separating the feedstock material in the first stripper.

6. The distillation system according to claim 5, further comprising:

a steam supplier that supplies steam to the first stripper and the second stripper;

a first valve configured to be opened or closed so as to control whether or not to supply the steam to the first stripper; and a second valve configured to be opened or closed so as to control whether or not to supply the steam to the second stripper.

7. The distillation system according to claim 6, further comprising a third valve configured to be opened or closed, and to induce a portion of the steam being supplied from the steam supplier towards the thermal vapor recompression module.

\* \* \* \* \*